US010185317B2

(12) United States Patent
Pichlmaier et al.

(10) Patent No.: US 10,185,317 B2
(45) Date of Patent: Jan. 22, 2019

(54) AUTOMATED AGRICULTURE SYSTEM

(71) Applicant: AGCO International GmbH, Hesston, KS (US)

(72) Inventors: Benno Pichlmaier, Munich (DE); Thiemo Buchner, Saal a.d. Donau (DE)

(73) Assignee: AGCO International GmbH, Neuhausen (CH)

(*) Notice: Subject to any disclaimer, the term of this patent is extended or adjusted under 35 U.S.C. 154(b) by 0 days.

(21) Appl. No.: 15/532,200

(22) PCT Filed: Dec. 2, 2015

(86) PCT No.: PCT/EP2015/078393
§ 371 (c)(1),
(2) Date: Jun. 1, 2017

(87) PCT Pub. No.: WO2016/087535
PCT Pub. Date: Jun. 9, 2016

(65) Prior Publication Data
US 2017/0336787 A1 Nov. 23, 2017

(30) Foreign Application Priority Data
Dec. 4, 2014 (GB) .................................. 1421527.1

(51) Int. Cl.
G05D 1/00 (2006.01)
A01B 69/04 (2006.01)
(Continued)

(52) U.S. Cl.
CPC ......... *G05D 1/0027* (2013.01); *A01B 69/008* (2013.01); *A01B 79/005* (2013.01);
(Continued)

(58) Field of Classification Search
CPC .. G05D 1/0027; G05D 1/0016; G05D 1/0214; G05D 1/0274; G05D 1/0276;
(Continued)

(56) References Cited

U.S. PATENT DOCUMENTS 9,671,790 B2 * 6/2017 Srivastava ............... B64D 1/02
2003/0229435 A1 * 12/2003 Van der Lely ......... A01B 79/00
701/50
(Continued)

FOREIGN PATENT DOCUMENTS

EP 1 369 013 A1 12/2003
WO 2014/160589 A1 10/2014
WO 2015/057638 A1 4/2015

OTHER PUBLICATIONS

Luis Emmi, et al., "New Trends in Robotics for Agriculture: Integration and Assessment of a Real Fleet of Robots", Published online Mar. 30, 2014.*
UK Intellectual Property Office, International Search Report for Priority UK Application No. GB1421527.1, dated Jun. 4, 2015.
European Patent Office, International Search Report for International Application No. PCT/EP2015/078393, dated Mar. 10, 2016.

*Primary Examiner* — Aaron L Troost
*Assistant Examiner* — Paula L Schneider

(57) ABSTRACT

A system for performing an agricultural operation on a field, the system including a host vehicle, two or more autonomous agricultural machines configured for performing the said agricultural operation; and a control subsystem for path planning and controlling the movement of each autonomous agricultural machine relative to the host vehicle in the performance of the agricultural operation. The control subsystem is configured to dynamically re-plan the movement of one or more of the autonomous agricultural machines in
(Continued)

response to a detected failure of an autonomous agricultural machine as indicated by its position relative to its planned path.

11 Claims, 5 Drawing Sheets

(51) Int. Cl.
*G05D 1/02* (2006.01)
*A01B 79/00* (2006.01)

(52) U.S. Cl.
CPC ......... *G05D 1/0016* (2013.01); *G05D 1/0214* (2013.01); *G05D 1/0274* (2013.01); *G05D 1/0276* (2013.01); *G05D 1/0291* (2013.01); *G05D 1/0297* (2013.01); *G05D 2201/0201* (2013.01)

(58) Field of Classification Search
CPC .............. G05D 1/0291; G05D 1/0297; G05D 2201/0201; A01B 69/008; A01B 79/005
USPC ............................................................ 701/2
See application file for complete search history.

(56) References Cited

U.S. PATENT DOCUMENTS

| | | | |
|---|---|---|---|
| 2007/0233337 A1* | 10/2007 | Plishner | G05D 1/0295 701/23 |
| 2009/0079839 A1* | 3/2009 | Fischer | G01S 7/003 348/218.1 |
| 2014/0081505 A1* | 3/2014 | Klinger | G08G 1/162 701/25 |
| 2017/0205833 A1* | 7/2017 | Gariepy | G05D 1/0297 |

* cited by examiner

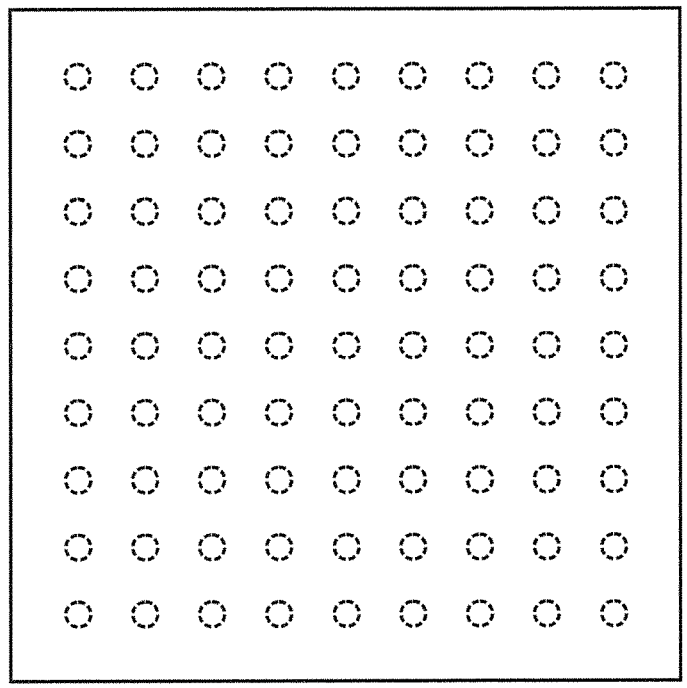
FIG. 3A
FIG. 3B
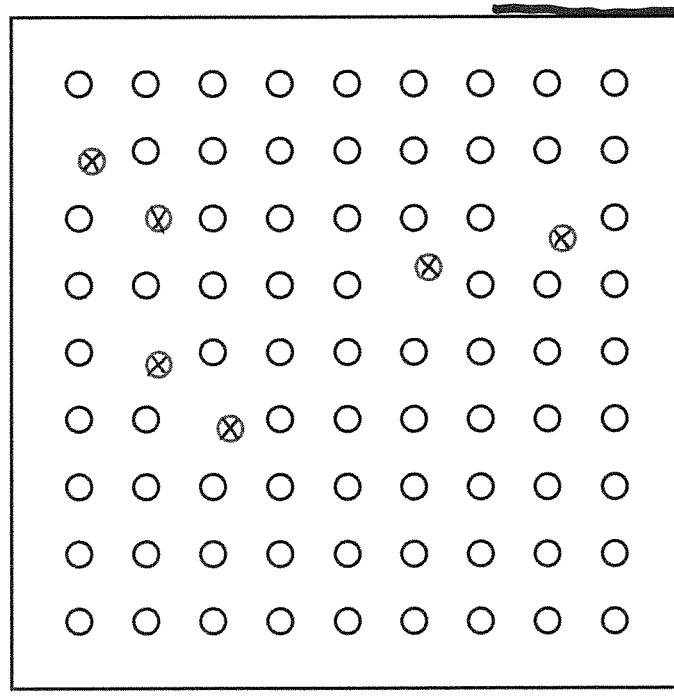

AUTOMATED AGRICULTURE SYSTEM

BACKGROUND OF THE INVENTION

Field of Invention

The invention is related to automated agriculture systems comprising one or more driverless vehicles configured to perform agricultural tasks such as planting, seeding, feeding or weeding without direct intervention or control by an operator.

Description of Related Art

Ensuring food supply is the main challenge for the future of human life on planet earth. To reach for a sustainable and sufficient food supply current agricultural production systems and methods will need to go through radical changes. Arable land is limited: its effective, sustainable use is mandatory, especially as competition for use (Food, Feed, Fuel, Fiber) grows. High production costs provoke high food prices, especially critical for poor countries, and inaccurate use of seeds and agrochemicals results in high production costs and wasted resources.

Precision Farming (the accurate use of resources down to the plant as smallest individual unit) is a necessary measure to approach the mentioned challenges, but this is hard to achieve with large scale equipment (from a technical perspective as well as an economical perspective) and soil damage cannot substantially be reduced on heavy equipment due to the laws of growth (3D mass versus 2D contact area).

The answer to some of these issues are small automated driverless vehicles (robots) able to operate around the clock without human surveillance. Most robot concepts for agriculture follow an autarkic sensor approach, where the robot unit itself detects and evaluates the environment and reacts to changing conditions. Those stand-alone systems are complex, costly and hard to handle.

One known example of such a driverless vehicle is the "Prospero" robotic farmer, described at http://dorhoutrd.com/, which vehicle comprises a robotic planter configured operate in clusters to traverse an area to be planted or otherwise worked (herein referred to as a field or target field) and plant seeds with each machine visually recording their location by means of a spray of white paint over the seeding site. The Prospero system uses numerous sensors and complex communication algorithms, thus incorporating all disadvantages of the above mentioned stand-alone systems.

A further robot agriculture concept is described in European patent EP 1,369,013B which describes a system for performing a first and a second agricultural operation on a field. The system is provided with a first autonomous agricultural machine for performing the first agricultural operation, with a second autonomous agricultural machine for performing the second agricultural operation, a control-unit for controlling the agricultural operations to be performed, the control-unit being suitable for subdividing the field into at least a first and a second portions, and for first performing the first and the second agricultural operations on the first field portion, and subsequently on the second field portion. Further examples of systems of multiple autonomous agricultural machines are described in WO2014/160589 and WO2015/057638.

It is an object of the present invention to provide a system which avoids at least some of the above-mentioned disadvantages.

Overview of the Invention

In accordance with the present invention there is provided a system for performing an agricultural operation on a field, said system comprising:
 a host vehicle;
 two or more autonomous agricultural machines (AAM) configurable for performing the said agricultural operation; and
 a control subsystem for path planning and controlling the movement of each AAM relative to the host vehicle in the performance of the agricultural operations;
wherein the control subsystem is configured to dynamically re-plan the movement of one or more of the AAM's in response to a detected operational failure of an AAM as indicated by its position relative to its planned path. By dynamically reallocating the paths traversed by one or more other AAM's already operating in the field, the agricultural operation may still be completed without the need to introduce a spare or replacement AAM that would otherwise be standing idle. An operational failure may be caused by a functional failure of an AAM, or may be due to an obstacle in the field.

A operational failure of an AAM may be indicated if that AAM is on its planned path but not moving at a predetermined speed, and/or if that AAM remains stationary for longer than a predetermined period (perhaps due to an obstacle). By determining failure based simply on position, detailed on-board monitoring and sensors may be avoided enabling the AAM's to be produced more simply and cheaply than would otherwise be the case.

Where the agricultural operation is planting, the delivered resource from the AAM may comprises seed. Where it is spraying, the resource may be water, fertilizer, or pesticide or any other liquid, gaseous or solid matter. Alternately or additionally, where the or each autonomous agricultural vehicle is electrically powered, the resource may be energy in form of fuel or an electric charge. By enabling the AAM's to replenish necessary resources in the field, they need not carry for example a full days supply and thus can be made smaller and lighter, reducing the effects of soil compaction.

The path planning and control data may be transmitted wirelessly as one or more data packets from the control subsystem to an AAM and each AAM is preferably configured to, after a predetermined interval, transmit a response packet. In such an arrangement, each AAM may be configured to include performance (position and timestamp) data of the AAM in a response packet, which collated performance data may be stored in storage means associated with the control subsystem as a field map for future operations. The control subsystem may be configured to detect failure of an AAM based on performance data or the absence thereof, and may additionally be arranged to establish a map including unworkable areas (e.g. due to obstacles) for future operations.

Further features and advantages of the present invention will become apparent from reading the following description of embodiments of the invention, given by way of example only, with reference to the accompanying drawings in which:

BRIEF DESCRIPTION OF THE DRAWINGS

FIGS. 3A and 3B respectively represent a seeding plan and a map of actual seeding positions;

DETAILED DESCRIPTION OF THE INVENTION

Figure 1:
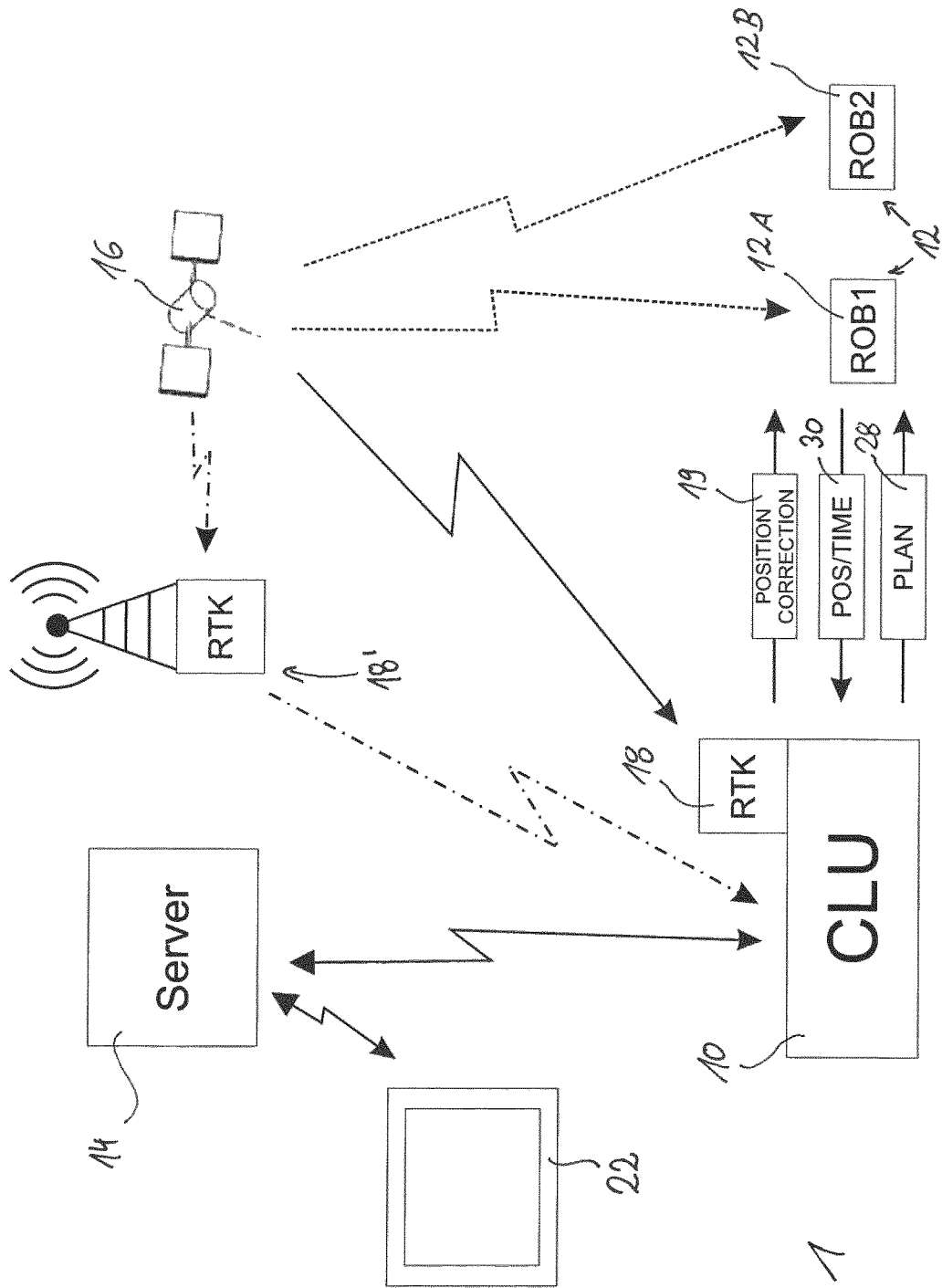
FIG. 1 schematically represents the components of an automated agriculture system for performing an agricultural operation on a field.

FIG. 1 schematically represents the components of an automated agriculture system for performing an agricultural operation on a field. A host vehicle 10, also referred to herein as a central logistical unit (CLU), is accompanied in the field by one or more autonomous agricultural machines (AAMs) or robots 12 configurable for performing the agricultural operation, for example as planters, feeders, weeders or sprayers. Preferably a cluster of robots 12A, 12B etc. is provided to allow for dynamic allocation and reallocation of tasks to individual robots, as discussed further below. A control subsystem operable to control the performance of the agricultural operation is suitably provided in a distributed manner (cloud computing) represented by remote server 14.

Positional guidance for the robots 12 is provided by a global navigation satellite system (GNSS) represented by satellite 16, with real-time kinematic (RTK) enhancement to enable centimeter accuracy in the positioning of the robots 12. The RTK reference station or beacon 18 is provided by the host vehicle, preferably carried by the CLU 10 as shown which relays the RTK-derived position correction data 19 to the robots 12. In an alternative arrangement shown in FIG. 2, the CLU 10 may be a further AAM configured to position the RTK beacon 18 at a selected location relative to the field 20 to be worked. Alternatively (referring back to FIG. 1), the CLU 10 may be provided with means to receive correction signals via mobile phone communication from an RTK reference station situated distant to the field (identified as RTK networks 18') and forward this signal to the robots 12. The RTK reference station or beacon 18 installed on the CLU or positioned by the CLU can then be omitted.

Mobile communication devices 22 (e.g. smartphone, tablet) are used as a human machine interface to display system states, diagnostics etc. and receive strategic orders from a remote operator. Furthermore mobile communication devices 22 may be able to control and distribute software updates provided by suppliers or dealers.

Figure 2:
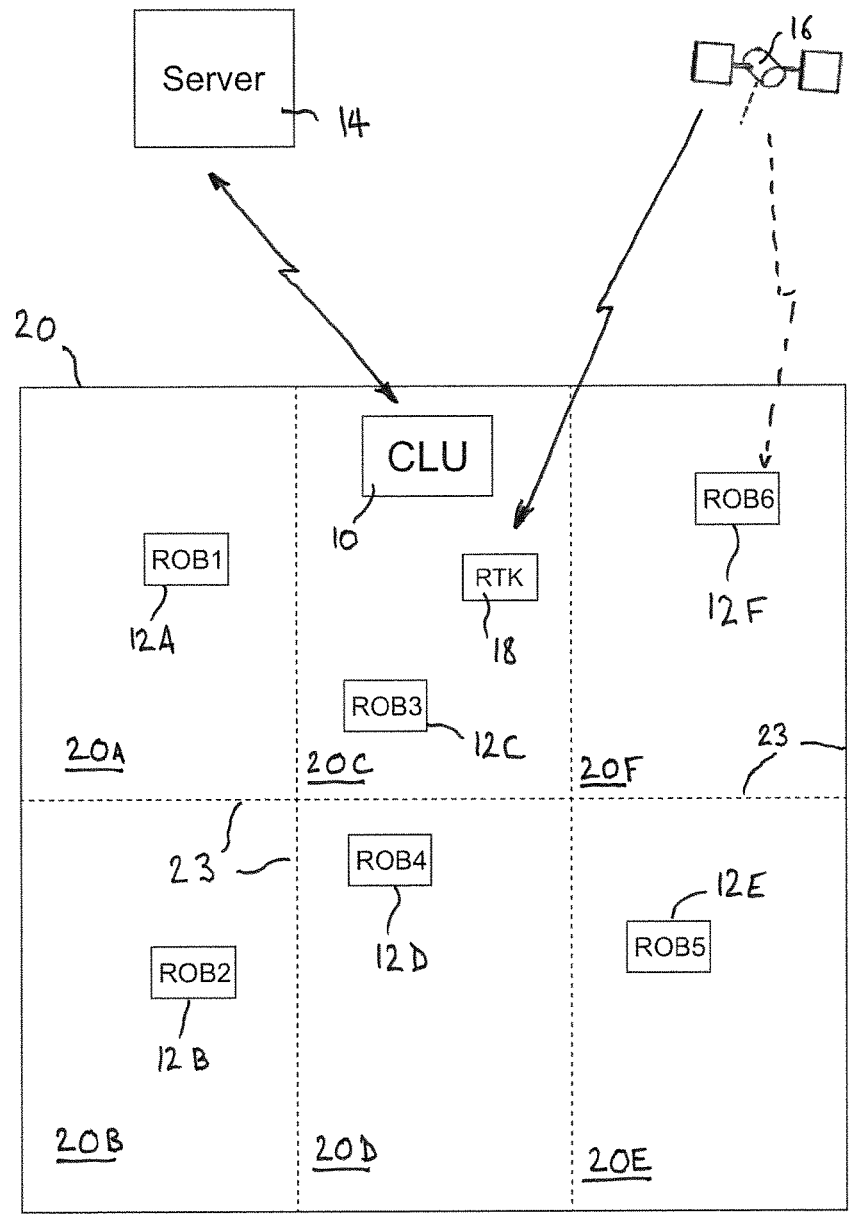
FIG. 2 is a plan schematic illustrating a field, the subdivision of the field into parcels, and the allocation of field parcels to respective autonomous agricultural machines.

In the following example, the agricultural task to be performed is seeding the field 20. The robots 12 are relatively small and light (<50 kg) and have a drive system, communication and location means and a seeding unit on board. An optimum position (target GNSS position) of each seed in the field is defined offline, as represented by the seed plan in FIG. 3A. The robots 12A, 12B navigate and seed without human interaction, within a respective limited, predefined area 20A, 20B as shown in FIG. 2 and with an optimized seed pattern. The respective areas 20A, 20B etc. each have a surrounding geofence 23. Alternatively, the robots 12A, 12B may work fields in contoured paths (or any other shape or in parallel) whereby each robot is working a predetermined path coordinated with the path the other robots. In such an arrangement, the field would not be worked in areas 20A, 20B defined with a geofence 23 but in path lines for each robot 12A, 12B. Leaving the allowed area (or path) by a robot or communication breakdown will lead to an immediate fail safe stop. A cloud based optimizing and supervising algorithm performs offline and online path and duty planning of the robot group (discussed further below) and reacts to any system disturbance like robot errors or failure, obstacles or dynamically changing soil conditions.

The communication between the robots 12 and the cloud (via CLU as a relay station) will now be described. As real time communication between the system components is not feasible due to costs and technical challenges, the communication will be provided in packages e.g. via mobile phone communication. The control subsystem (cloud) sends a data package 28 containing the seeding (task) plan (in which position a seed has to be placed) and then aborts communication. The robots receive the package and work through the (task) seeding plan. During this work, the robot stores data:
1. the position where the seed was placed.
2. at least two times and the related position (e.g. time: 12.01 and Position X, time 12.02 and position Y)
3. additionally the robot may send data indicative of robot functionality (e.g. current of the motor).

This data is assembled in a package 30 and is then sent via the CLU 10 to the cloud after a defined time interval. The cloud uses the data for a number of purposes. Firstly, due to obstacles or other causes, a seed may not be positioned exactly according to the plan of FIG. 3A, so the location of each individual planted seed is stored as represented at FIG. 3B, where the crossed circles identify those seeds out of position. This stored position information can be used in subsequent agricultural operations for e.g. weed control, repeated fertilizing (to apply fertilizer only at positions with a seed), and individual plant monitoring.

The seed plan shown in FIG. 3A provides a seed deposition in rows known from standard seeders dragged by tractors today. Alternatively, the seed plan may provide a seed deposition which is irregular or in any other non-row shape to follow the needs of individual plants or different crops. A seed plan with irregular shape may result in that areas of the field contain too many stones or other obstacles for sufficient crop growth.

Additionally, the data referring to time and position can be used to detect failure. E.g. the cloud can decide if the robot is moving too slowly or wrongly with reference to the planned path (deviation between planned time/position and reached time/position). This may be caused by wet soil and slippery conditions for example. In such circumstances, the cloud can then change the task and/or path plan.

Using data indicative of robot functions may help to sort out problems, at the same time preserving the simplicity approach: if the motor shows low performance but the vehicle should otherwise move fast (detected by the time and position data as above), the energy in the robot may be low, indicating a recharge may be required.

Figure 4A:
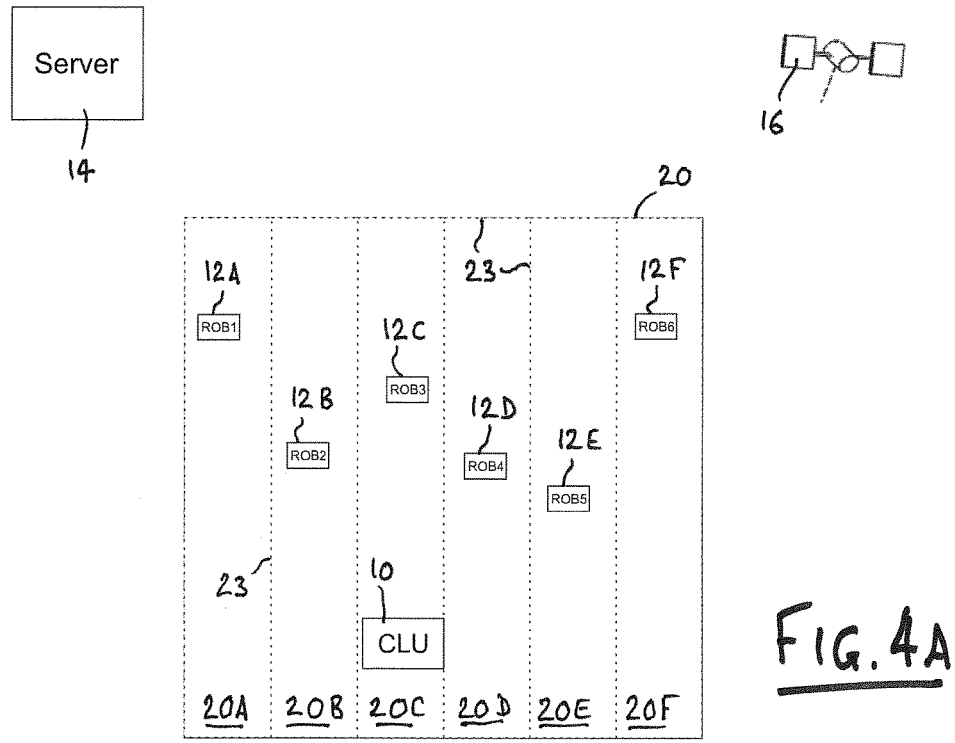
FIGS. 4A and 4B represent the reallocation of workload amongst a group of autonomous agricultural machines following failure of one machine.
Figure 4B:
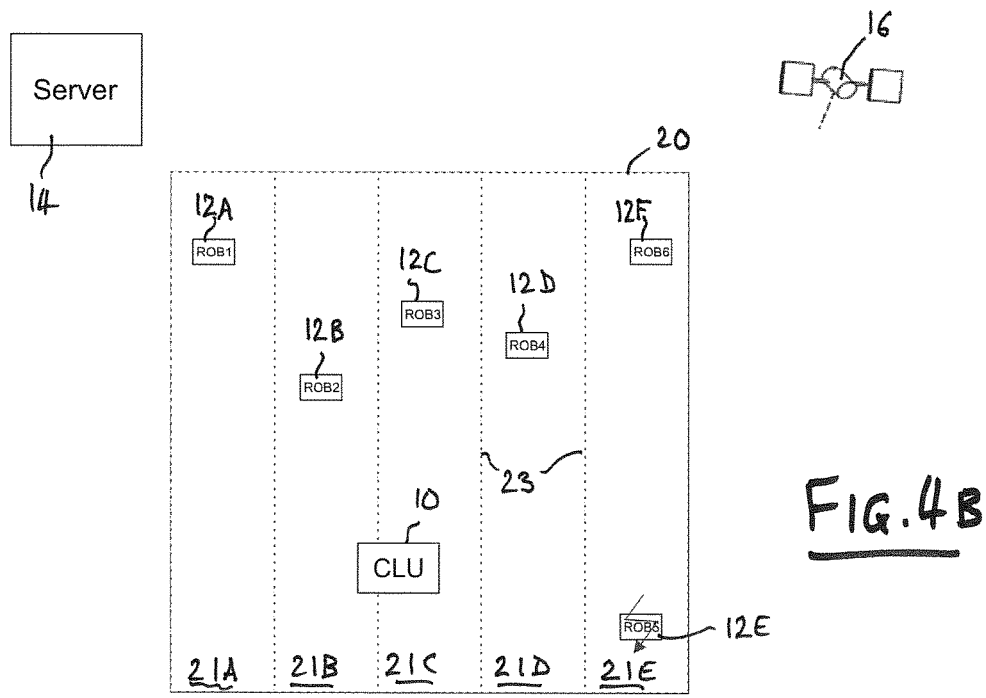

To overcome complex error handling, system failures are detected solely by means of the robots actual position/movement in relation to the pre-planned and dynamically recalculated path/position. FIG. 4A represents a field divided into six substantially equal parcels 20A-20F with each being tended by a respective robot 12A-12F. If one of the robots 12E fails or becomes stuck, then as shown in FIG. 4B the cloud algorithm repartitions the field into five substantially equal parcels 21A-21E, assigns respective ones of the remaining robots 12A-12D, 12F to each parcel, calculates for each robot a respective new path to be followed, and delivers the new instruction to each.

Failed or stuck units are shut down and an alert will be sent to the farmer or any other operator (dealer or contractor) via the handheld device 22. Collision can be foreseen by monitoring the actual paths of all robots and will be avoided by the algorithm in the cloud.

To overcome cost issues associated with multi sensor robots or large autonomous equipment, the single robot units 12 of the present system only use position detection (GNSS) and communication with cloud services to navigate and operate. The CLU 10 provides a GNSS/RTK base and relay station for communication with the cloud.

Figure 5A:
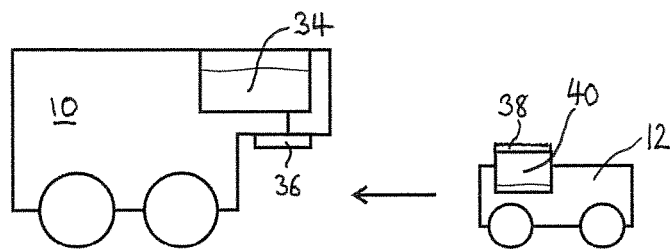
FIGS. 5A-5C are a sequence representing replenishing of an autonomous agricultural machine by a host vehicle.
Figure 5B:
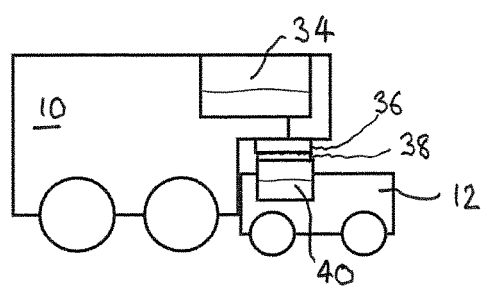
Figure 5C:
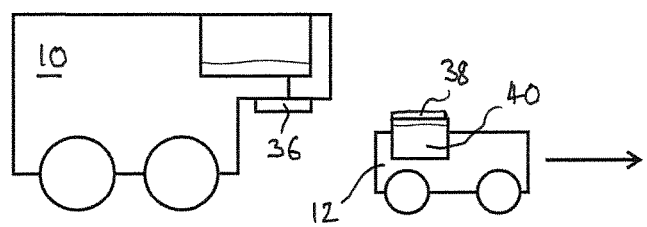

As shown by FIGS. 5A to 5C, the host vehicle CLU 10 comprises a reservoir 34 holding a resource required to enable the or each robot 12 to perform the agricultural operation. Each robot and the CLU 10 comprise mutually configured means 36, 38 for delivery of the resource from CLU to robot in the field. In FIG. 5A a robot 12 having low supply in an onboard reservoir 40 approaches the CLU. In FIG. 5B the mutually configured means 36, 38 cooperate to position the robot such that resource from the CLU reservoir 34 may be transferred to the robot reservoir 40 with minimal or zero spillage. In FIG. 5C, with the mutually configured means 36, 38 having disengaged, the replenished robot 12 returns to the performance of the agricultural operation.

As will be understood, there are many forms that the mutually configured means 36, 38 may take, from simple guide rails or bodies to complex electromagnetic clamping systems, although simpler options are preferred in order to keep the cost of a robot to a minimum. Where the robot is configured as a planter, resource delivered will include seeds and optionally also fertilizer. Where the robot is instead configured as an application vehicle (e.g. a sprayer), the delivered resource may be water, fertilizer, pesticide or any other liquid, gaseous or solid matter as required.

Figure 6:
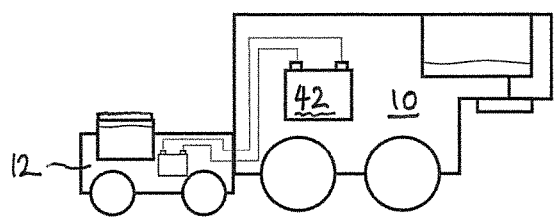
FIG. 6 shows an alternative form of replenishing of an autonomous agricultural vehicle by a host vehicle.

In an alternative or additional variant, the delivered resource includes energy such as fuel for the robot. As represented by FIG. 6, where the robot is electrically driven the resource from the CLU will be an electrical charge from a battery 42 or generator of the CLU. Although shown differently coupled than in FIG. 5, it will be understood that the mutually configured means 36, 38 may additionally be arranged to provide a current path between CLU and robot when engaged to enable battery charging and replenishment of reservoir 40 to be performed simultaneously. In a further alternative, the CLU 10 may provide means to exchange the complete battery instead of recharging it, to minimize down time for a robot. The CLU may then be enabled to recharge the exchanged and recharged battery for the next robot. The CLU may also be provided with means to generate electrical energy such as by means of solar panels, fuel cells or other such means.

In a variant, where the robot 12 is configured to perform a task such as harvesting or weeding, the mutually configured means may be arranged to permit material accumulated by the robot to be transferred to a hopper or reservoir of the CLU 10, reversing the order of FIGS. 5A-5C.

Figure 7:
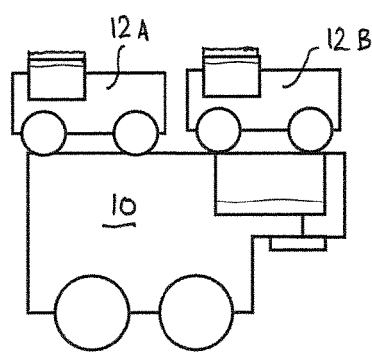
FIG. 7 represents a plurality of autonomous agricultural vehicles being carried by a host vehicle.

The CLU 10 also acts as storage/transport device and, as shown in FIG. 7, is operable to carry two or more robots 12 to a field to be worked. This is advantageous as the robots need not be designed to meet legal requirements to travel on public roads. Suitably, the CLU is provided with a mechanism to refuel or recharge the robots during transport.

In the foregoing the applicants have described a system for performing an agricultural operation on a field, including a host vehicle, two or more autonomous agricultural machines configured for performing the said agricultural operation; and a control subsystem for path planning and controlling the movement of each autonomous agricultural machine relative to the host vehicle in the performance of the agricultural operation. The control subsystem is configured to dynamically re-plan the movement of one or more of the autonomous agricultural machines in response to a detected failure of an autonomous agricultural machine as indicated by its position relative to its planned path.

From reading the present disclosure, other modifications will be apparent to persons skilled in the art. Such modifications may involve other features which are already known in the field of agricultural machines and component parts thereof and which may be used instead of or in addition to features already described herein, and the scope of the invention is limited only by the following claims.

The invention claimed is:

1. A system for performing an agricultural operation on a field, said system comprising:
   a host vehicle;
   two or more autonomous agricultural machines (AAM) configurable for performing the said agricultural operation; and
   a control subsystem for path planning and controlling movement of each AAM relative to the host vehicle in performance of the agricultural operation wherein the control subsystem is configured, in response to detection of a failure of any AAM as indicated by a position of a failed AAM relative to a planned path, to dynamically re-plan the movement of one or more of the remaining AAMs so that the remaining AAMs may complete the performance of the agricultural operation in the absence of the failed AAM; and wherein path planning and control data is transmitted wirelessly as one or more data packets from the control subsystem to an AAM and, each AAM is configured to, after a predetermined interval, transmit a response packet.

2. The system as claimed in claim 1, wherein the failure of the AAM is indicated when the failed AAM is on the planned path but not moving at a predetermined speed.

3. The system as claimed in claim 1 wherein the failure of the AAM is indicated when the failed AAM remains stationary for longer than a predetermined period.

4. The system as claimed in claim 1, wherein each AAM is configured to include performance data of the AAM in the response packet.

5. The system as claimed in claim 4, wherein the performance data includes position and timestamp data.

6. The system as claimed in claim 4, wherein collated performance data is stored in a storage means associated with the control subsystem as a field map for future operations.

7. The system as claimed in claim 4, wherein the control subsystem is configured to detect the failure of any AAM based on the performance data.

8. The system as claimed in claim 1, wherein the failure of any AAM is indicated by the absence of receipt by the control subsystem of the response packet.

9. The system as claimed in claim 1 wherein the control subsystem is a processing device remote from said two or more AAM's.

10. The system as claimed in claim 1, wherein the control subsystem is an access means to a control program hosted across any number of a plurality of distributed devices.

11. The system as claimed in claim 1, wherein the control subsystem is a processing device carried by the host vehicle.

* * * * *